United States Patent

[11] 3,632,989

[72] Inventor Kuno Kasischke
 Goppingen, Germany
[21] Appl. No. 850,327
[22] Filed Aug. 6, 1969
[45] Patented Jan. 4, 1972
[73] Assignee Gebi Boehringer G.m.b.H
 Goppingen, Germany
[32] Priorities May 17, 1967
[33] Germany
[31] B 92 570;
 Aug. 8, 1968, Germany, No. P 17 63 790.0
 Continuation-in-part of application Ser. No. 727,607, May 8, 1968, now abandoned. This application Aug. 6, 1969, Ser. No. 850,327

[54] METHOD AND SYSTEM FOR PRODUCTION OF PROGRAM CONTROLS FOR MACHINE TOOLS
 20 Claims, 2 Drawing Figs.
[52] U.S. Cl............................................................ 235/61.9 R,
 235/151.11, 235/61 PE
[51] Int. Cl............................................................ G06f 3/12
[50] Field of Search............................................ 235/151.11,
 151.1, 61 PA, 61 PB, 61 PC, 61 PD, 61 PE, 61 PF,
 61 PG, 61 PH, 61 PS, 61 PK, 61.1, 61.9; 340/152,
 153

[56] References Cited
 UNITED STATES PATENTS
 2,147,626 2/1939 Bryce et al................. 235/61
 2,898,175 8/1959 Rice, Jr. et al............. 235/61
 2,998,914 9/1961 Thomas et al.............. 235/61
 3,000,555 9/1961 Innes............................ 235/61

Primary Examiner—Thomas A. Robinson
Attorney—Birch, Swindler, McKie and Beckett

ABSTRACT: In the production of command data carriers for control of machine tools, a conventional language information input from a keyboard is recorded by a printer and applied to a simplified computer. The computer calculates and feeds machine tool control commands, both in a machine-related code to a device for producing a command data carrier, and in conventional language to the printer for producing a conventional language record of the commands. The computer also calculates and causes printout of the advance time for producing a workpiece, from information supplied also from a coordinate reader, which scans a drawing of the workpiece.

METHOD AND SYSTEM FOR PRODUCTION OF PROGRAM CONTROLS FOR MACHINE TOOLS

CROSS REFERENCE TO RELATED APPLICATION

This application is a continuation-in-part of my prior application Ser. No. 727,607, filed May 8, 1968, and now abandoned.

BACKGROUND OF THE INVENTION

1. Field of the Invention

This invention relates to an improved method and system for producing programs for the control of program-controlled machine tools and, more particularly, to a method and system incorporating a small, or simplified, computer compatible with established techniques of systems analysis for the production of such program controls.

2. State of the Prior Art

In the past, one or the other of two basic methods or approaches has normally been used for the production of program controls. In the manual programming method, the commands for each program step are worked out individually by a programmer and plotted on a program sheet. In the machine programming method, an electronic data-processing system automatically determines the commands and records them in a suitable carrier or storage system. In both methods, there is ultimately produced a command data carrier, typically a punched tape, in which the requisite program control commands, for example, for control of a machine tool, are stored.

Machine programming with the aid of an electronic data-processing system is much faster than the manual programming method. In machine programming, descriptions of the rough workpiece and the finished job, generally in coordinate-related values, and information regarding the material to be worked, are fed into the data-processing system. The system automatically divides the work to be performed into several individual stages of operation. The system then calculates the corresponding commands and stores these commands in the command data carrier. For example, to turn down a shaft extension from the rough, several roughing cuts may be required. The computer is fed the foregoing information and then calculates automatically the requisite number of roughing cuts and the particular depth of each cut and prepares the corresponding commands.

The use of machine programming for producing a command data carrier, however, requires a considerably outlay for the electronic data-processing system, since this system must be able to store and process the requisite complex and comprehensive program. In addition, a data-processing system of this kind is not available to every manufacturer.

As a result, manual programming is still widely used. The programmer, on the basis of his knowledge of what the particular machine tool can do and of how it is controlled, must think through each program step in detail in terms of the particular operations and make corresponding calculations from which the particular position of the tool, the feed rate, the cutting speed, and the like are obtained. Manual programming therefore is subject to the drawbacks not only that it is time-consuming but also that it requires a specially trained and appropriately qualified staff.

BRIEF DESCRIPTION OF THE INVENTION

This invention overcomes these and other defects and disadvantages of the prior art methods and systems for the development of machine tool controls and particularly is directed to the simplification of the operations and calculations which are required in manual programming. The method and system of the invention are developed to be compatible with, and to correspond to, the work heretofore carried out by technical staffs including, for example, systems engineers and analysts and production planners.

In accordance with the method of the invention for producing command data carriers for program-controlled machine tools, information relating to the individual steps of the production planning process is fed in, in conventional language, through a keyboard. The information is printed out on a program sheet in conventional language as a record of the information by a printer controlled by the keyboard. The commands required for the execution of each particular step are calculated by a computer responsive to the keyboard input. The commands are calculated by the computer both in a machine-related code suited for control of the machine tool concerned, for application to a device which produces the command data carrier, and in conventional language for application to the printer which thereby produces a conventional language record of the commands.

The invention also comprises a system for producing a command data carrier for a program-controlled machine tool. The system includes a keyboard for the entry, in conventional language, of information relating to production planning process steps. A computer, controlled by the keyboard input, is programmed to calculate commands for the tool on the basis of the information. The computer produces control command outputs both in a machine-related code and in conventional language. A printer is controlled by the keyboard to produce a conventional language record of the input information and by the conventional language output of the computer to produce a conventional language record of the commands. A data-carrier-producing device is controlled by the machine code output of the computer to produce a command data carrier in a machine-related code suitable for the control of said tool.

The information fed in to the keyboard may include details concerning travels (e.g., design of cam profiles) tool sizes, feeds, tools, and the like.

The present invention uses a logical combination of component assemblies to make possible a production planning and control system, which requires only a minimum expenditure for computer components and utilizes, to a substantial extent, the results of work typically carried out by technical personnel including systems and methods engineers and production planners. These technical personnel initially analyze and assess the individual steps required in a production process. The results of their work then is employed in automatically developing a tool control program, which ultimately takes the form of a command data carrier. This program is developed on the basis of information which is determined step by step in the process planning. As a result, the work of the planning or systems analysis department, which is normally available in a modern production facility, can be fully exploited in accordance with the present novel method and system of the invention for producing the command data carrier, without any need for training specialists in the way heretofore required with manual programming.

The step-by-step production of the program, utilizing the results of the production planning work, can be effected simply by using a small computer having prewired individual programs. The computer therefore need not be particularly comprehensive or extensive. The programs are directly associated with the necessary production steps, as determined by the production planning technicians and the resultant step-by-step mode of operation is responsible in large part for the lack of complexity of the computer system.

The present invention thus enables smaller factories which do not have direct access to electronic data-processing systems to set up programs providing completely automated machine tool control. Thus, the field of application of digitally controlled machine tools is substantially broadened and these machines are made more economical.

The computer may also be used, in conjunction with an optical coordinate reader which scans a drawing of the workpiece to be produced, to calculate in advance the time for production of the workpiece.

Figure 1:
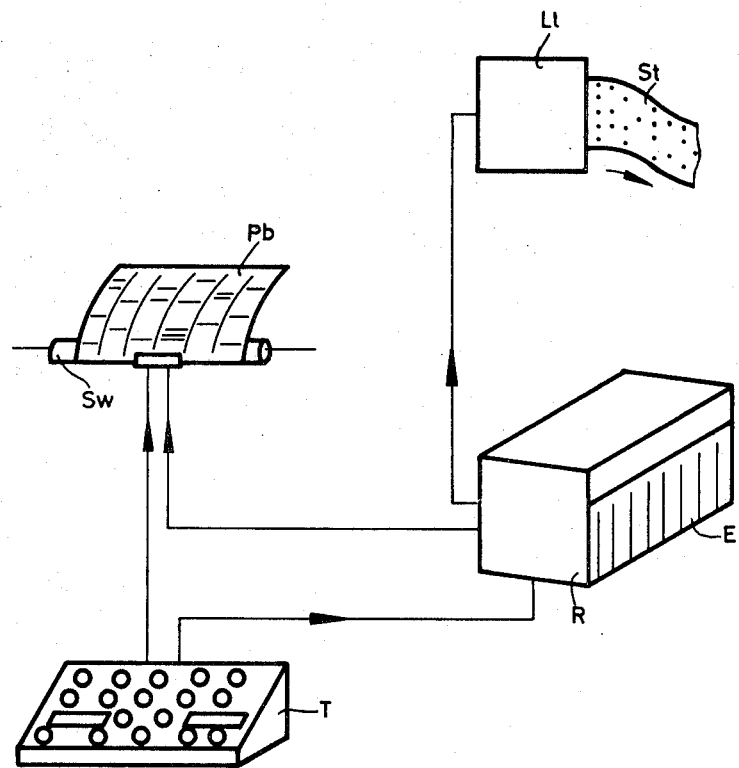
FIG. 1 is a block diagram showing the basic components of one embodiment of the invention.

DETAILED DESCRIPTION OF THE INVENTION:

In FIG. 1, a keyboard T is illustrated which enables the programmer to feed in, in conventional language, the measurements of the workpieces for each individual operation, e.g., a roughing cut, along with the appropriate feed. These data are transmitted in the form of electrical signals from keyboard T both to the printer $S_w$ and to the small computer R. The printer $S_w$ is electrically controllable and may comprise, for example, a teleprinter. The printer $S_w$ prints out on the program sheet Pb in a row and column configuration, and in conventional language, the quantities fed in via the keyboard T. The program sheet Pb is thus obtained, and by this means the individual stages in the sequence of operations can be precisely traced. The program sheet also provides a convenient, conventional language record of the input information.

The signals fed from the keyboard T to the computer R are processed by the latter in accordance with the programs stored in it. The computer R produces the necessary commands in accordance with the required format or control language and also in terms of the appropriate code of the machine tools to be controlled. The commands are therefore appropriately adapted for processing by the machine tool or tools in question. In this context, for example, the computer has to calculate on the basis of the exact component sizes fed to it, what position the particular tool, for example a turning tool, has to adopt in terms of the coordinates of the particular machine. This is a simple calculation in which the starting point is substantially a predetermined origin in a coordinate system, so that the required program can be kept simple.

In addition, the computer can easily calculate associated or related values. For example, assuming a predetermined maximum cutting speed, the computer can calculate the requisite r.p.m. and then, or a particular, desired surface finish, the feed rate, and so on. These values may be of importance to the programmer so that they too can be printed out by the printer $s_w$. Also, the computer can monitor and check the values obtained. For example, the computer can compare these values with predetermined limiting values or boundary conditions which are stored in it, and in the event that the operation is not confined within these limits, can produce a corresponding signal.

THe output of the computer is connected to the input of the printer to control the latter in accordance with the results of its calculations. The commands produced by the computer R are also fed to the punched tape perforator L1 and control its perforation of the punched tape $S_t$. The punched tape comprises the command data carrier used for the subsequent control of the machine tool. Other carriers may be employed as an alternative to the punched tape, for example, a magnetic tape.

The computer may also provide additional outputs. On the basis of the information supplied to the computer, for example, the relevant component sizes and also the feed rate and cutting speed, the computer may calculate the required time for performing an operation. These operation times may be of interest to the programmer and accordingly are also printed out by the printer, on the program sheet. This determination of the required times for performing the individual operations may also be employed by the computer to calculate the total production time. It is merely necessary in this case, for the computer to total the individual operation times, which does not require a very extensive program. Since the computer determines all the operation cycles individually in terms of time, it is also able to determine not only the actual time of each operation, but also the interval or nonoperating times. The computer may thereby determine that a machine is operating uneconomically, as indicated by an excessively long interval time.

Since the computer need only be programmed to calculate values and commands for individual steps of the process, it is also able, without imposing too severe a requirement in terms of programming, to carry out certain monitoring functions. For example, the computer may determine, from the component size and the machine information fed into it, whether, at a given or desired speed in advancing through the steps of the process, a given maximum torque or machine power might be exceeded. It is possible in this context either to provide some means of signaling such an overshoot, or to allow for these maximum values in advance. In the latter case, the computer may determine in each case the maximum possible cutting speed and by its control calculations prevent these maximum values from being exceeded.

As will be apparent from the results to be determined, only simple short or uncomplicated logic system combinations are required whereby a wired program will suffice. Wired programs in slide-in board form, such as printed circuit boards or removable modules, are particularly suitable for this purpose. With this kind of arrangement, the individual program can easily be altered by exchanging boards, allowing the computer to be adapted to a plurality of different kinds of machining procedures and calculations. In FIG. 1, this arrangement has been indicated by the presence of the boards E. Other systems for storing the programs may also be used. Nevertheless, as long as program stores, in particular core-type stores, remain as expensive as they currently are, wired programs will take preference. Thus, the system of the invention is very advantageous in view of its need for only a limited, or small computer.

In addition to monitoring of the requisite operation time, the system of the invention may also monitor the program itself. The control of many tools, for example a turning tool, requires that the tool be returned to its initial position once machining has been completed. The computer derives for this purpose a check function on the basis of the commands which it produces, thereby defining the particular tool displacements and algebraically totaling these displacements. For example, if at the end of the machining operation the tool is back in its initial position, the algebraic addition yields the value 0, since all the tool displacements will cancel out.

If, for example, a method in accordance with the invention is applied by a programmer to the problem of turning a pin of specific length in two roughing cuts and a finishing cut, then, in principle, the following factors and results will appear on the program sheet:

First, the machine to be used is determined on the basis of the job sizes. Next, the requisite tool is selected on the basis of the material to be machined, e.g., a certain king of turning tool. Then, as determined from the drawing of the component being produced, the programmer starts to fix the dimensions of the individual cuts by feeding in through the keyboard the coordinate values of the boundaries or limits which the tool is to reach during the individual cuts. Considering a roughing cut, these boundary coordinates will include the start of the cut, the point at which the cut finishes, the terminal point of the tool withdrawal movement and finally the terminal point of the rapid return (back-traverse) movement. All these points or boundaries are determined in terms of job-oriented coordinates and not in terms of machine coordinates. The latter are calculated by the computer. For each of these four points, there is provided a corresponding line on the program sheet. The job-related coordinates and also the machine-related coordinates are then printed out by the printer for each of these points on its corresponding line. The first-mentioned coordinates are supplied to the printer by the keyboard, and the last-mentioned ones by the computer. Then, in a conventional way, a maximum cutting speed will be laid down so that the computer, taking into account the available machine speeds, will calculate the speed which is nearest to the cutting speed limit. This figure is printed out by the printer and also the effective cutting speed which it achieves. In addition, the actual commands fed into the command data carrier will be printed out in a corresponding form on the program sheet. The same applies to feeds, tool change, and time calculation, as already described. All these values are likewise printed out row by row upon the program sheet. It will be clear from the foregoing that the procedures which the programmer must follow and perform largely coincide with the mental procedures already performed by the production planner, in that the programmer in any case has to think through the steps which the production planner has had to consider himself. To this extent, therefore, the method of the invention can be incorporated in a particularly logical manner into existing procedures of production planning and systems analysis.

Figure 2:
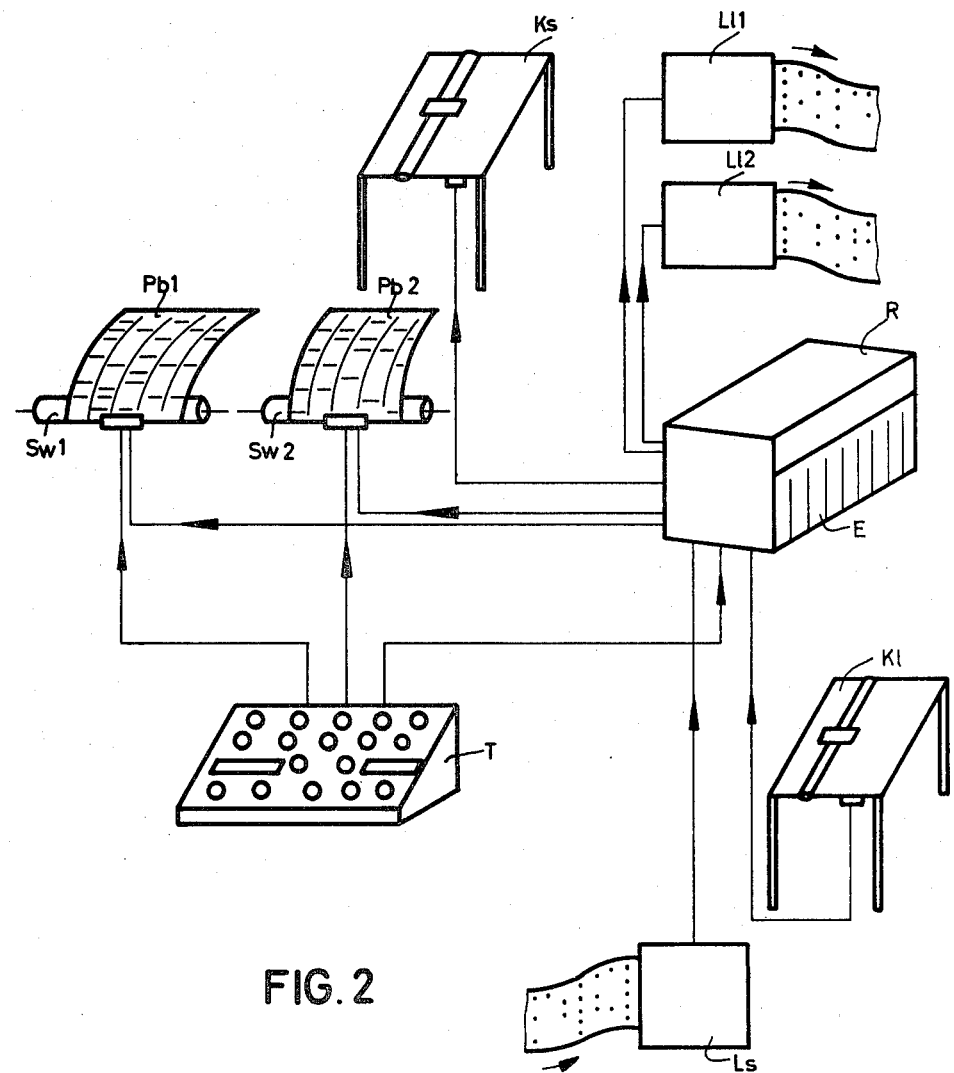
FIG. 2 is a block diagram incorporating additional operating systems in an embodiment of the invention closely related to that of FIG. 1.

In the embodiment of the invention shown in FIG. 2, there are provided a number of additional devices through the use of which the method of the invention can be implemented in a particularly expedient fashion. Connected to two outputs of the computer R are two punched tape perforators L11 and L12. The computer R contains the necessary programs for supplying the perforators L11 and L12 with commands of different format and coding. By this technique, the system may simultaneously produce command data carriers, such as punched tapes, having different formats and coding corresponding to differently controlled machine tools, but providing control for the manufacture of one and the same component or end product. Similarly, where this multiple production of command data carriers is concerned, as in the example of FIG. 2, there may also be provided two corresponding printers Sw1 and Sw2 for printing associated program sheets Pb1 and Pb2. These two printers likewise both receive their signals from the computer R and print out in conventional language, as already described in relation to FIG. 1.

In many machining operations, for example when turning a radius, certain program steps occur repeatedly. In this kind of situation, it is convenient to store these steps separately in the form of a subroutine and to feed this subroutine in at a suitable point in the formation of the main program. For this purpose, there is provided in the system of FIG. 2 a command store scanning device, shown as a punched tape transmitter Ls, to which a punched tape carrying the subroutine is fed. The signals produced by the punched tape carrying transmitter Ls are fed into the input side of the computer R and the latter determines from hem the requisite commands. The computer R then feeds the commands to one of the printers Sw1 or Sw2 and to one of the punched tape perforators L11 or L12. As is apparent, the command store scanning device can be some other element, such as a magnetic card scanner. This method of combining a punched tape transmitter with the computer R moreover makes it possible in simple fashion to convert from program to program so that the formal or the fundamental code may be changed. This kind of requirement arises, for example, if a complete command data carrier is available for a specific machine tool control operation and it is required to convert this data carrier in order to be able to manufacture the same component on a machine which has a different kind of control.

Frequently, it is required, for the purpose of checking the programmer's work, to read off the component sizes determined from the drawing, directly from the drawing itself, because in this way input errors are largely excluded. For this reason, in the arrangement of FIG. 2 a coordinate pickup K1 is provided by means of which, in a conventional way, the contours of a component described on a drawing placed on the reader, can be traced, whereupon the reader transmits the coordinates of the component to the computer R in the form of electrical signals. Since the contours of the drawn component are traced in accordance with the displacements of the tool, the result of the signals transmitted to the computer in each case is that undesired collision between the tool and the job being machined is automatically avoided. The monitoring of the input of the job coordinates can be taken a step further by arranging for a coordinate plotter to trace out the values supplied to the computer. A coordinate plotter of this kind has been illustrated in FIG. 2 and marked Ks. It is connected to the output side of the computer R and traces out the tool movements in accordance with the commands determined by the computer. It is also possible to use the coordinate plotter Ks to check whether or not a program fed into the punched tape transmitter Ls is correct. To this end, the computer R is supplied with a program which in each case produces signals from the individual commands read by the punched tape transmitter Ls, which signals correspondingly control the coordinate plotter Ks. The coordinate plotter Ks may also be simultaneously controlled by operation of the keyboard T, the computer R converting the signals supplied to it from the keyboard T into a corresponding control of the coordinate plotter Ks. In his fashion, it is likewise possible to carry out a check on whether the values fed in by the keyboard T are in fact producing the desired movement on the part of the tool.

The above-described process can also be advantageously employed within the scope of the production planning, i.e. for obtaining in advance the exact-advance times for the manufacture of a workpiece on a machine tool, before the program for the control of a program-controlled machine tool is produced. This is for example necessary, in order to be able in advance to ascertain the most economic manufacturing methods and in order if possible to obtain an early warning of a burden which might later occur on a given machine depot. In accordance with the invention, this aim is solved in that the workpiece dimensions are optically scanned by means of the coordinate reader K1 from the relevant workshop drawing, and the thus obtained values are supplied to the small computer R, which in the evaluation of the further pieces of information supplied to it from the keyboard, merely controls the writing device for the printing of data containing the desired times.

The scanning of the workpiece dimensions can take place by means of the coordinate reader, without special requirements concerning accuracy, since for the pure ascertaining of time, fractions of millimeters, or often even millimeters themselves, are not important, so that the workshop drawing need only be optically scanned. Moreover, in he advance time calculation and printout process, the command data carrier need not be prepared, since this is not necessarily required for production planning. It is merely important here to be able to gather the desired times from the information printed by the writing mechanism, which the small computer calculated as a result of its programming per operational stage. For the supervision of the time results, it is also possible in addition to the course of the work given by following the workshop drawing, to print in the form of corresponding pieces of information. For this purpose, the programming of the computer as is necessary for the production planning can be employed. The data transferred from the coordinate reader to the computer merely signifies for example that a tool has been displaced by a certain length in a certain coordinate direction of the machine, or that the tool has changed its position in a number of coordinate directions, which for example results in the shape of an arc. Taking into consideration the relevant coordinate direction, e.g. in a swivel, these pieces of data indicate whether it is a question of the turning of a cylinder, of a cone, or of a flat surface. Since these pieces of information can be gathered more implicitly from the coordinates, it is possible by means of corresponding programming of the computer to allow this determination to be made directly from these coordinates, as to which work operation is concerned, i.e. for example the turning of a cylinder or the turning of a flat surface. With corresponding programming, this piece of information can then be printed out directly in plain language.

The thus produced working plan, thus represents an indication for the work process of producing the relevant workpiece in accordance with the individual work processes, whereby at the same time each time necessary for this is specially printed out. Here, it can be a question of the individual operation times as well as of the additional times, e.g. rest times, preparation times, and measuring times. In addition, the sum of all these times can be given, so that at a glance, the whole time necessary for producing a workpiece is given. If now, the times obtained as a result of such data sheets are added as machine engagement times, there thus results a certain machine engagement time for a machine with a known quantity of a workpiece. This production of the machine engagement times can of course be accordingly expanded for the entire machine depot.

In the apparatus of FIG. 2, the keyboard T can be used for feeding in the technological values for the relevant work stages, i.e. for example a feed rate, but not however the relevant workpiece dimensions. The information about the respective cutting depth generally is part of the technological information. The workpiece dimensions are produced by means of the coordinate reader KL, with which the contours of a workpiece are followed in accordance with an applied workshop drawing, merely supervising this by optical means, whereby the coordinate reader signals the thus obtained coordinates of the workpiece in electrical signals. The pieces of data fed in via the keyboard T and those obtained by the coordinate reader KL are supplied to the small computer R, which obtains the time necessary for the relevant work process, for each work stage, e.g. the turning of a cylinder as a result of the tool size, feed and the r.p.m. of the relevant machine supplied to said small computer. If here, in the relevant work stage, it is a question of manual operations, e.g. a measuring process, the computer thus obtains corresponding time increases due to its programming. Furthermore, the computer recognizes the direction of movement of the machine, this due to the signals supplied to it from the coordinate reader KL. Thus it recognizes for example the turning of a cylinder and converts this into corresponding signals, which are supplied to the writing mechanism Sw, which prints out the relevant pieces of information on the work plan. The information cylinder, length of the cylinder, the relevant feed, and, as essential result the work time, then appear on this work plan for example, in plain language.

By means of the simple following of the contours of a workpiece on a drawing placed on the coordinate reader K1, and the relevant technological data fed in via the keyboard, there thus results a work plan, on which the individual work stages are printed in steps in plain language, and on which the associated work times are given. At the end, the total necessary time can be given by an addition which the small computer R can finally carry out, whereby in each case there are also contained necessary additional time for manual performance, which in general represent values of experience or percentage values, since they are in each case included due to the stepwise organization of the work planning. By means of corresponding programming, the small computer R is also easily able to take into account different scales of the drawings.

For producing the work plan it is thus essentially only necessary to follow optically the contours of the relevant workpiece on the drawing by means of the coordinate reader K1, whereby in each case at the end of one work stage, the technological pieces of data for the next work stage are fed in by striking keys of the keyboard T. For following the contour of a workpiece with, for example 20 work stages, times of a few minutes generally result for the printing out of the work plan. Since this process occurs so rapidly, it is suitable for simulating a number of work processes by way of a test with regard to a workpiece, in order in this way to obtain the most favorable work plan. Moreover, the process in accordance with the invention is particularly suitable for printing out the work plan for a workpiece to be produced on a conventional machine, this essentially since, as mentioned above, the production of the work plan occurs so rapidly. However, in this way, the range of use of the process in accordance with the invention is considerably extended, i.e. beyond program-controlled machines to conventional machines.

The punched tape transmitter Ls serves, as previously indicated, to supply subprograms to the miniature computer R. In the case of particular, frequently occurring process stages, e.g. the turning of a shoulder, expediently such subprograms are used, based upon which the relevant control of the machine is obtained. Here it is a question of allowing the writing device Sw to print out these pieces of information, as well as the time necessary for them, in plain language with the aid of the subprogram given by the punched tape transmitter Ls, e.g. in the case of a curvature.

Now, in order to obtain the processing times of a number of workpieces, which are to be produced on a machine, the punched tape perforator L1 can be used, which receives the individual processing times in signal form, and punches these on the punched tape St. The punched tape St then represents a store for processing times, which fed into a computer, can be added up by the latter. For this, the punched tape transmitter Ls can also be utilized, to which end the computer R should be provided with a corresponding program.

In summary, the method and system of the invention are highly effective for producing command data carriers for the control of machine tools. In addition to producing the carrier in the requisite machine-related code, the system provides for producing a permanent record of both the information and any and all control commands, in conventional language. The method and system are flexible in that they permit the use of various additional control techniques and equipment in accordance with production requirements.

It will be evident that many minor changes may be made in the apparatus described herein, without departure from the scope of the invention. Indeed, it will be appreciated that the several auxiliary features shown in FIG. 2 can be used independently of each other. For example the reader K1, computer R, and keyboard T can be used with only a single printer Sw, and also with a single punch L11, etc. Accordingly, the invention is not to be considered limited by such description, but only by the scope of the appended claims.

What is claimed is:

1. A method of producing command data carrier for program control of machine tools on the basis of information relating to individual steps of a production planning process, comprising the steps of:
    entering the information relating to individual steps of a production planning process in conventional language on a keyboard for application both to a printer for producing a conventional language record of the information and for entering it in a computer,
    calculating machine tool control commands responsive to the information by said computer, said computer being programmed to compute appropriate machine tool control commands from aid conventional language information, and
    supplying the commands from said computer both in a machine-related code suited for controlling the machine tool to a device for producing the command data carrier, and in conventional language to said printer for producing a conventional language record of the commands.

2. A method as recited in claim 1, wherein machine tools controlled according to different codes are required for performing a given process, comprising the further step of simultaneously calculating machine tool control commands in different machine-related codes corresponding to said differently controlled machine tools.

3. A method as recited in claim 2 further comprising the step of supplying the differently coded machine-related tool control commands to respectively associated devices for producing differently coded command data carriers for control of the corresponding machine tools.

4. A method as recited in claim 3 further comprising the step of supplying each of the differently coded machine-related tool control commands from said computer in conventional language to an associated printer for producing a conventional language record of the commands for control of the corresponding machine tool.

5. A method as recited in claim 1 comprising the further steps of:
    supplying additional information relating to steps of a production planning process from a command store scanner, and calculating the machine tool commands in response both to the information fed in to the computer from the keyboard and from the command store scanner.

6. A method as recited in claim 1 wherein a component to be produced is represented in final form in a drawing and comprising the further steps of:
scanning the drawing with a coordinate reader to derive information of the required production steps in coordinate values related to the component, and
calculating machine tool control commands in response both to the information fed in to the computer from the keyboard in conventional language and from the reader in coordinate values.

7. A method as recited in claim 6 wherein said scanning step is optical in nature and including the step of reading out from the computer in conventional language form the times required for the several stages of production of the component to be produced.

8. A method as recited in claim 7 wherein the total time required for production of the component is read out in conventional language.

9. A method as recited in claim 1 further comprising the steps of:
supplying the commands from said computer in coordinate related values to a coordinate plotter, and
tracing the particular tool movements by the coordinate plotter to provide a drawing corresponding to the machine tool movements produced by the control commands.

10. A method as recited in claim further comprising the steps of:
calculating in the computer the time required for the machine tool to perform the operation corresponding to each command determined by said computer, and
supplying the operating times corresponding to each individual command to the printer for producing a conventional language record of these times.

11. A method as recited in claim 10, further comprising the step of adding the individual operating times to determine the total time required for completing the process.

12. A method as recited in claim 1 further comprising the steps of:
calculating the parameters of each tool displacement responsive to the machine tool control commands from said computer, and
algebraically adding the displacements upon completion of the process to provide a check function for monitoring the program.

13. A system for producing command data carriers for program control of machine tools comprising:
a keyboard for the entry of information in conventional language relating to production planning process steps for finishing a workpiece,
a computer controlled by said keyboard and programmed to calculate commands for a given command-controlled machine tool in accordance with said information, said computer producing command outputs both in a machine-related code suited for controlling said machine tool and in conventional language,
a printer controlled by said keyboard for producing a conventional language record of said information and controlled by the conventional language command output of said computer for producing a conventional language record of said commands, and
a data carrier producing device controlled by the machine-related code command output of said computer for the production of a data carrier suitable for the control of said tool.

14. A system as recited in claim 13 wherein there is further provided a plurality of command data carrier producing devices.

15. A system as recited in claim 14 wherein there is further provided a plurality of printers corresponding to said plurality of command data carrier producing devices.

16. A system as recited in claim 13 wherein machine tools controlled by different codes are required for performing a given process, further comprising:
a plurality of command data carrier producing devices,
a plurality of printers corresponding to said plurality of command data carrier producing devices, and
said computer being programmed to simultaneously calculate commands for said tools in different machine-related codes corresponding to said differently controlled, machine tools and including means for providing a plurality of machine related code command outputs to corresponding command data carrier producing devices and a plurality of conventional language command outputs to the respectively corresponding printers.

17. A system as recited in claim 13 wherein there is further provided a command store scanner connected to the input of said computer for control thereof.

18. A system as recited in claim 17 wherein said scanner comprises a punched tape transmitter.

19. A system as recited in claim 13 wherein a component to be produced is represented in final form in a drawing, and wherein there is further provided:
a coordinate reader for scanning the drawing to derive information of the required production steps in coordinate values related to the component, and
said computer responding to the coordinate values produced by said coordinate reader in calculating the machine tool control commands.

20. A system as recited in claim 13 wherein:
said computer calculates the machine tool control commands in coordinate related values, and there is further provided
a coordinate plotter responsive to the coordinate related values calculated by said computer for producing a drawing for recording the machining tool movements produced by the control commands.

* * * * *